United States Patent [19]

Herron

[11] 4,353,429
[45] Oct. 12, 1982

[54] OVERDRIVE UNIT FOR AUTOMOTIVE VEHICLE

[76] Inventor: Lonnie L. Herron, 1517 Berkshire, Westland, Mich. 48185

[21] Appl. No.: 150,720

[22] Filed: May 19, 1980

[51] Int. Cl.³ .................. B60K 17/00; F16H 57/02
[52] U.S. Cl. ......................... 180/70 MS; 74/606 R; 74/414
[58] Field of Search ............ 74/414, 421 R, 606 R, 74/745, 413; 248/674; 180/70 MS

[56] References Cited

U.S. PATENT DOCUMENTS

| 615,137 | 11/1898 | Caddick | 74/414 |
| 2,669,881 | 2/1954 | Skidmore | 74/421 R |
| 3,122,029 | 2/1964 | Shook et al. | 74/606 |
| 3,901,096 | 8/1975 | Woody | 74/413 |

Primary Examiner—Kenneth Dorner

[57] ABSTRACT

An overdrive unit for a vehicle comprising three spur gears mounted beneath the vehicle to form a connection between the transmission and the differential. The three spur gears are mounted side-by-side a sufficient distance beneath the vehicle body to provide space for inspection of the gears without removing the gear housing from the vehicle.

1 Claim, 3 Drawing Figures

OVERDRIVE UNIT FOR AUTOMOTIVE VEHICLE

BACKGROUND OF THE INVENTION

This invention is related to permanent overdrive units for automotive vehicles, and more particularly to such a unit employing three spur gears mounted side-by-side between the transmission and the differential.

Overdrive units are known in the art for increasing the efficiency of automotive vehicles. For example, such units are illustrated in U.S. Pat. No. 3,901,096 which issued to Woody on Aug. 26, 1975 and U.S. Pat. No. 3,122,029 which issued to Shook, et al on Feb. 25, 1964.

SUMMARY OF THE INVENTION

The broad purpose of the present invention is to provide an improved permanent overdrive unit for an automotive vehicle comprising three spur gears mounted in a housing between the transmission and the differential of the vehicle. Preferably the spur gears are mounted side-by-side a common distance beneath the vehicle body to permit the user to remove the gear housing cover and inspect the gears or replace the oil or the like.

The preferred embodiment can be easily attached to a conventional vehicle by modifying the drive shaft and attaching the gear housing to the bottom of the vehicle.

The preferred embodiment is composed of a relatively few components and provides an economical way to achieve greater mileage over vehicles not having such a unit.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
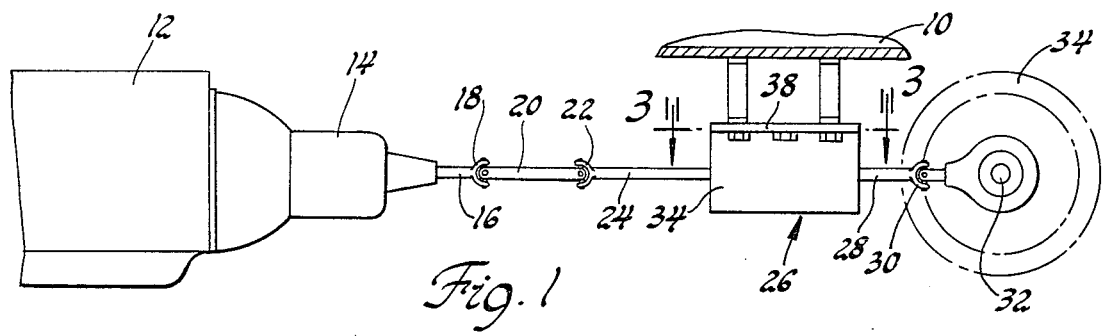
FIG. 1 is a fragmentary view of an automotive vehicle showing the preferred overdrive unit mounted beneath the vehicle body.

Referring to the drawing, FIG. 1 illustrates an automotive vehicle body 10 having a conventional engine 12 connected to an automatic transmission 14. Transmission 14 has an output shaft 16 connected by a universal joint 18 to a short shaft 20 which in turn is connected to a second universal joint 22 to a shaft 24. Shaft 24 forms a part of an overdrive unit 26 illustrating the preferred embodiment of the invention.

A shaft 28 extends from overdrive unit 26 to a universal joint 30 which in turn is connected to the input of a differential 32. Differential 32 provides means for transmitting power from the transmission to wheel means 34 in a manner well known to those skilled in the art.

Figure 2:
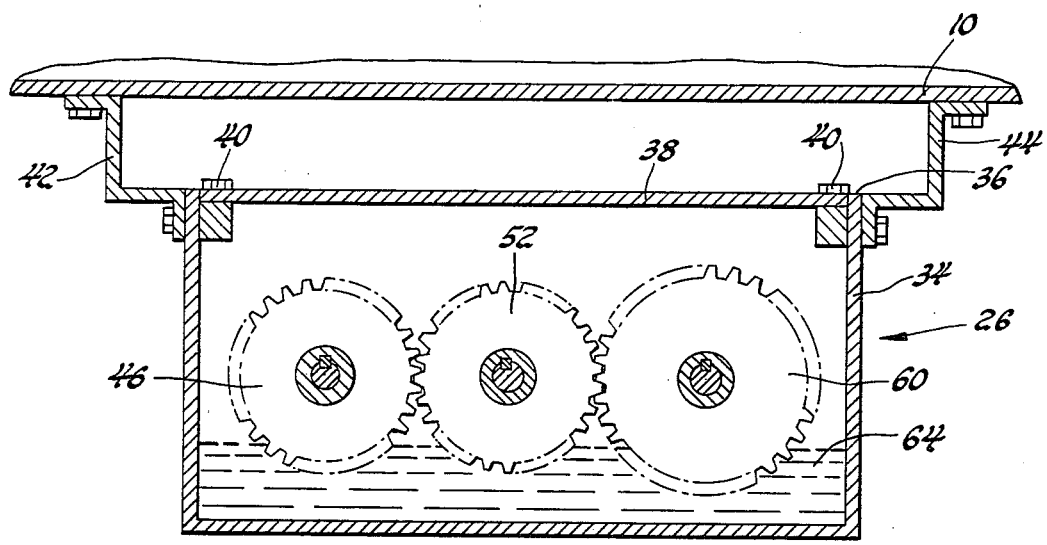
FIG. 2 is an enlarged view of the spur gears as seen along lines 2—2 of FIG. 1.
Figure 3:
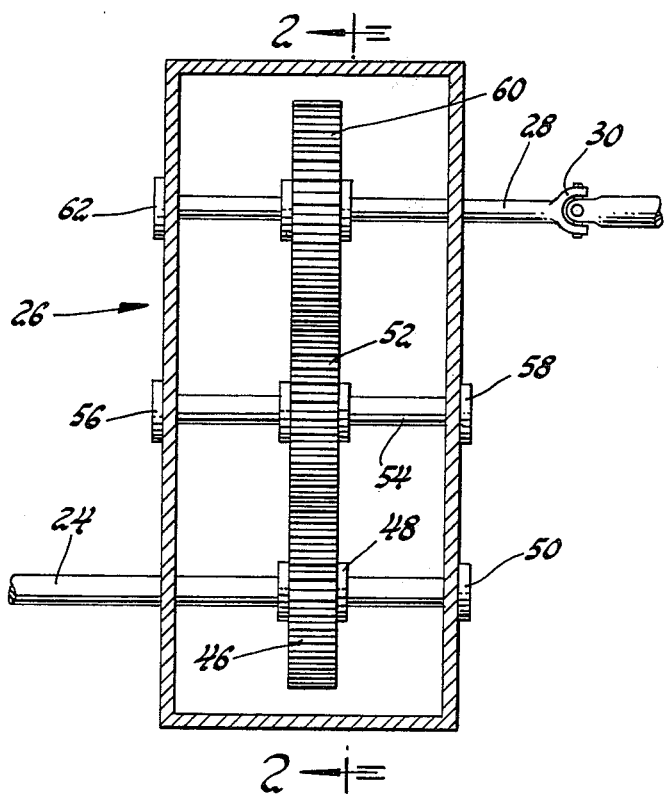
FIG. 3 is an enlarged sectional view as seen along lines 3—3 of FIG. 1.

Referring to FIG. 2, overdrive unit 26 comprises a housing 34 having an open top 36. Cover 38 is mounted by suitable fastener means 40 to the top of the housing. A pair of brackets 42 and 44 support the housing approximately eight inches below the bottom of vehicle 10 as illustrated in FIG. 3. This permits removal of cover 38 to allow the user to inspect the interior of the housing and for maintenance purposes.

A first spur gear 46 having thirty-six teeth is mounted in the housing on shaft 24. A collar 48 connects gear 46 to the gear shaft 24. A ball bearing 50 is mounted on the housing to support the extreme end of shaft 24.

A second spur gear 52 having twenty-two teeth is supported on a short shaft 54 in the housing. A pair of ball bearing means 56 and 58 support the ends of shaft 54 to the housing. Spur gear 52 is basically an idler gear and meshed with gear 46. A third spur gear 60 having twenty-two teeth is mounted on shaft 28. Ball bearing means 62 supports the extreme end of shaft 28 to the housing. Gear 60 is meshed with gear 52.

Preferably a quantity of lubricating oil 64 is disposed in the housing to contact the lower portions of gears 46, 52, and 62. The gear faces are also greased with 90 weight grease in the teeth to insure longer wear.

Referring to FIG. 3, it is to be noted that the three gears are mounted on parallel shafts, each supported an equal common distance beneath the bottom of vehicle 10. This arrangement not only reduces the vertical space necessary to support the gears but permits the housing interior to be inspected without removing the entire housing from the vehicle.

Having described my invention, I claim:

1. In combination with an automotive vehicle having a transmission having an output shaft, and a differential having an input shaft, overdrive means comprising:

a housing and means mounting said housing on said vehicle between said transmission and said differential, the housing having an open top, and including a cover mounted on the top in a position between the housing and the bottom of the vehicle, and bracket means supporting the housing in a position sufficiently beneath the vehicle bottom to permit removal of the cover;

a first spur gear mounted in the housing and connected to the transmission output shaft to rotate therewith;

a second spur gear mounted in the housing and meshed with the first spur gear so as to rotate therewith, but in the opposite direction;

a third spur gear mounted in the housing and meshed with the second spur gear to rotate therewith in the same direction as the first spur gear, and means connecting said third spur gear to the input shaft of the differential;

the first spur gear, the second spur gear, and the third spur gear being supported on parallel axes of rotation beneath the body of the vehicle, said axes being substantially an equal distance beneath said vehicle body.

* * * * *